United States Patent [19]

von Broock et al.

[11] Patent Number: 4,706,901
[45] Date of Patent: Nov. 17, 1987

[54] PROPULSION UNIT SUSPENSION FOR VEHICLES, ESPECIALLY FOR PROPELLER DRIVEN AIRCRAFTS

[75] Inventors: Ulrich von Broock, Weissach; Jürgen Hawener, Stuttgart, both of Fed. Rep. of Germany

[73] Assignee: Dr. Ing.h.c.F. Porsche Aktiengesellschaft, Stuttgart, Fed. Rep. of Germany

[21] Appl. No.: 777,440

[22] Filed: Sep. 18, 1985

[30] Foreign Application Priority Data

Sep. 20, 1984 [DE] Fed. Rep. of Germany ....... 3434453

[51] Int. Cl.$^4$ .............................................. B64D 27/00
[52] U.S. Cl. ...................................... 244/54; 248/554
[58] Field of Search .............................. 244/54, 53 R; 248/554–557; 60/39.31, 39.32

[56] References Cited

U.S. PATENT DOCUMENTS

| | | | |
|---|---|---|---|
| 2,327,062 | 8/1943 | Preston | 248/555 |
| 2,355,370 | 8/1944 | Frey | 248/554 |
| 2,539,960 | 1/1951 | Marchant et al. | 244/54 |
| 2,965,338 | 12/1960 | McLean | 244/54 |
| 3,020,004 | 2/1962 | Blyth et al. | 244/54 |
| 3,028,124 | 4/1962 | Sammons | 244/54 |
| 3,056,569 | 10/1962 | Bligard | 248/555 |
| 3,848,832 | 11/1974 | Stanley et al. | 244/54 |
| 4,531,694 | 7/1985 | Soloy | 244/54 |

FOREIGN PATENT DOCUMENTS 120981 6/1927 Fed. Rep. of Germany ........ 244/54

Primary Examiner—Joseph F. Peters, Jr.
Assistant Examiner—Lynn M. Fiorito
Attorney, Agent, or Firm—Barnes & Thornburg

[57] ABSTRACT

A propulsion unit suspension for propeller driven aircrafts in which a supporting frame is supported at a fire wall; the propulsion unit together with auxiliary aggregates is retained at the supporting frame in several bearings. The bearings of the supporting frame are arranged in two horizontal planes offset in height to one another with an axial distance to one another. The arrangement of the bearings takes place in such a manner that a line of action of the gravity and a further line of action of the propeller thrust extend through an ideal surface delimited by the bearings. In particular, the forward bearing is retained at the supporting frame within the area of a vertical longitudinal plane through the center of gravity as well as above the line of action of the propeller thrust and two rear bearings are located in the supporting framework at approximately the same distance on both sides to the vertical longitudinal plane of the center of gravity and below the line of action of the propeller thrust.

18 Claims, 6 Drawing Figures

PROPULSION UNIT SUSPENSION FOR VEHICLES, ESPECIALLY FOR PROPELLER DRIVEN AIRCRAFTS

The present invention relates to a propulsion unit suspension for vehicles, especially for propeller driven aircrafts with a supporting framework supported at a fire wall, at which the propulsion unit together with auxiliary aggregates is retained in several bearing supports.

It is known in the prior art to connect an aircraft propulsion unit with the aircraft frame by way of a supporting framework. Several elastic bearing supports are provided for that purpose at the supporting framework in which the propulsion unit is retained. With such propulsion unit bearing supports thrust forces result from the weight and the propeller which have the tendency to pivot the propulsion unit in its bearing supports, which is disadvantageous for the flight behavior. For avoiding such deflection movements of the propulsion unit, the bearing supports are constructed correspondingly stiff which, in turn, leads to the fact that the propulsion unit vibrations are no longer sufficiently isolated.

The present invention is concerned with the task to provide a propulsion unit suspension of the aforementioned type, by means of which a bearing support of the propulsion unit which is vibration-low with respect to the low frequencies, is assured together with good acoustic insulation.

The underlying problems are solved according to the present invention in that the bearing supports are arranged in such a manner with respect to one another in two horizontal planes offset in height that a line of action of the gravity and a further line of action of the propeller thrust extend through an ideal surface delimited by at least three bearing supports.

The principal advantages achieved with the present invention reside in that the bearing supports arranged in a particular manner relative to the center of gravity of the entire aggregate and to the propeller axis are matched in such a manner that the essentially static and dynamic loads coincide with the main directions of the spring-mass-system. Thus, for example, the propeller thrust produces in the bearings only reaction forces in the fight direction which leads to a purely translatory displacement of the drive aggregate in its elastic suspension. Additional rolling or pitching is avoided. As a result thereof the stiffnesses of the bearings in the directions disposed perpendicular to the propeller axis can be matched to the actually occurring loads.

In the vertical direction the bearings carry only the weight and support only the torque. They can thus be constructed very soft for a good acoustic insulation. For high positive or negative accelerations, for example in particular with acrobatic or stunt flying figures, appropriate abutments assure for the limitation of the spring paths.

The supporting framework is constructed in an advantageous manner as lightweight trussing framework and forms a unit extending over the propulsion unit from above. It includes tension and compression struts starting from a middle cross bearer which is rigid in bending and constructed as bow-shaped member; the tension and compression struts are secured at the forward end in a bearer receiving the forward bearing support. At the rear end the struts terminate in bearing places at the fire wall of the aircraft frame whereby the two rear bearing supports are retained between further struts. A reinforcement of the supporting frame is achieved by the bending-rigid bow-shaped members. It is thus prevented that the frame, in case of large vertical loads, bends up elastically at the forward centrally arranged bearing support and that this point is thereby lowered considerably. This high stiffness and rigidity is also of significance for a very good acoustic insulation of the entire retention system.

These and other objects, features and advantages of the present invention will become more apparent from the following description when taken in connection with the accompanying drawing which shows, for purposes of illustration only, one embodiment in accordance with the present invention, and wherein:

FIG. 6 is a cross-sectional view through a rear bearing support taken along line III—III of FIG. 4.

Figure 1:
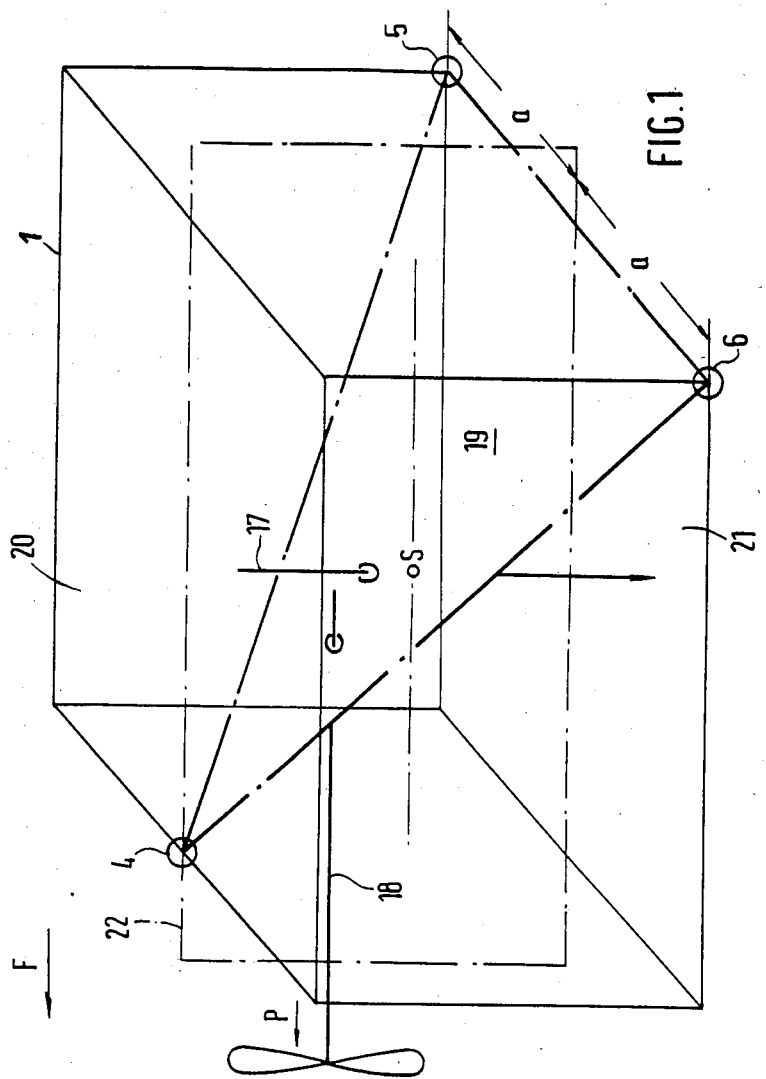
FIG. 1 is a schematic view of the arrangement of the bearing supports in relation to the line of action of the gravity and of the propeller thrust in a suspension system of the present invention.

Referring now to the drawing wherein like reference numerals are used throughout the various views to designate like parts, a propulsion unit generally designated by reference numeral 1 together with auxiliary aggregates is retained by a supporting framework generally designated by reference numeral 2 which is supported at a fire wall 3 of an aircraft frame and is connected with the fire wall. Elastic bearings 4, 5 and 6 which are arranged distributed and spaced, are provided at the supporting frame 2 which retain the propulsion unit 1.

Figure 4:
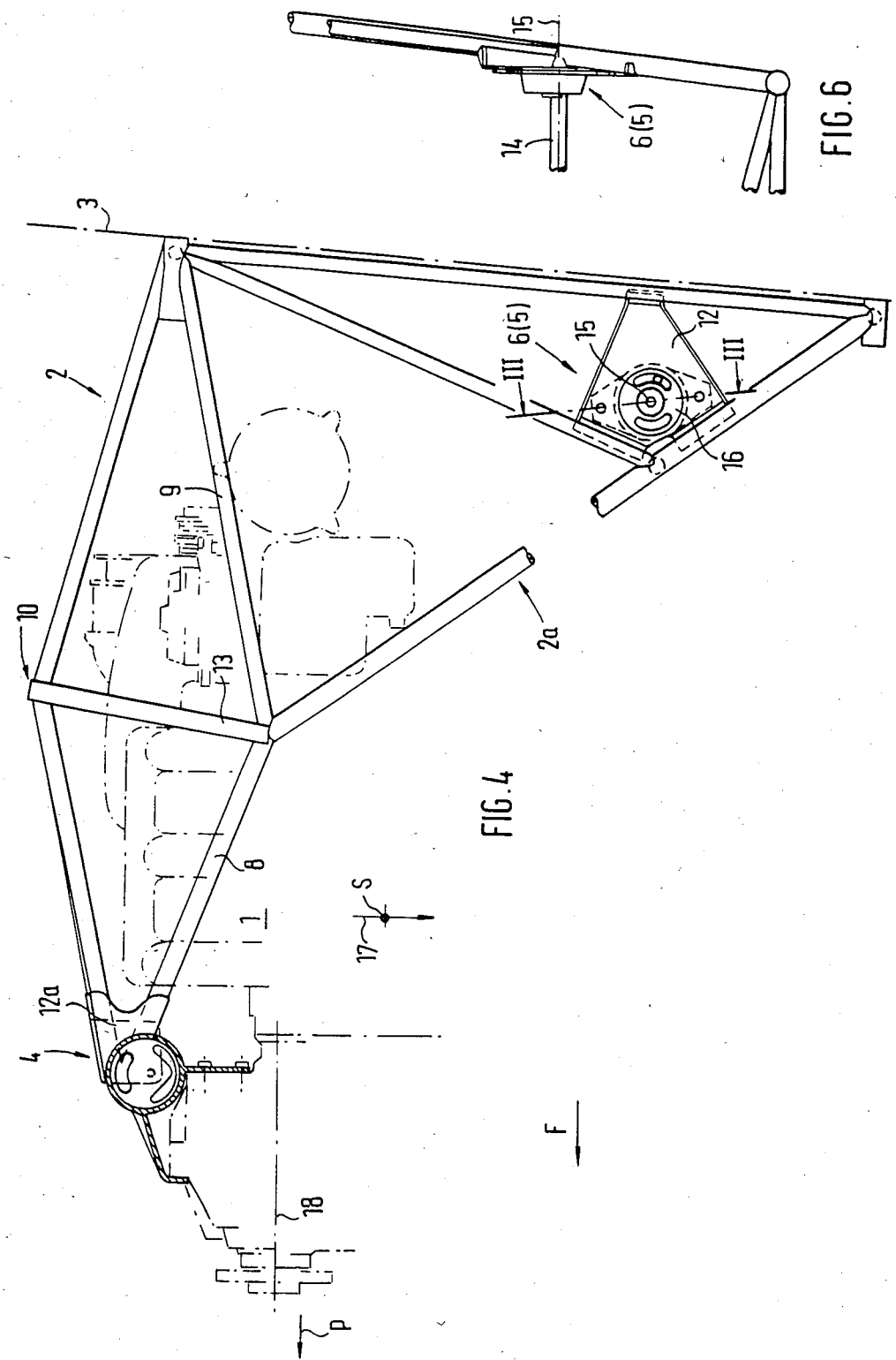
FIG. 4 is a side elevational view of the supporting framework with the bearing supports in accordance with the present invention.
Figure 5:
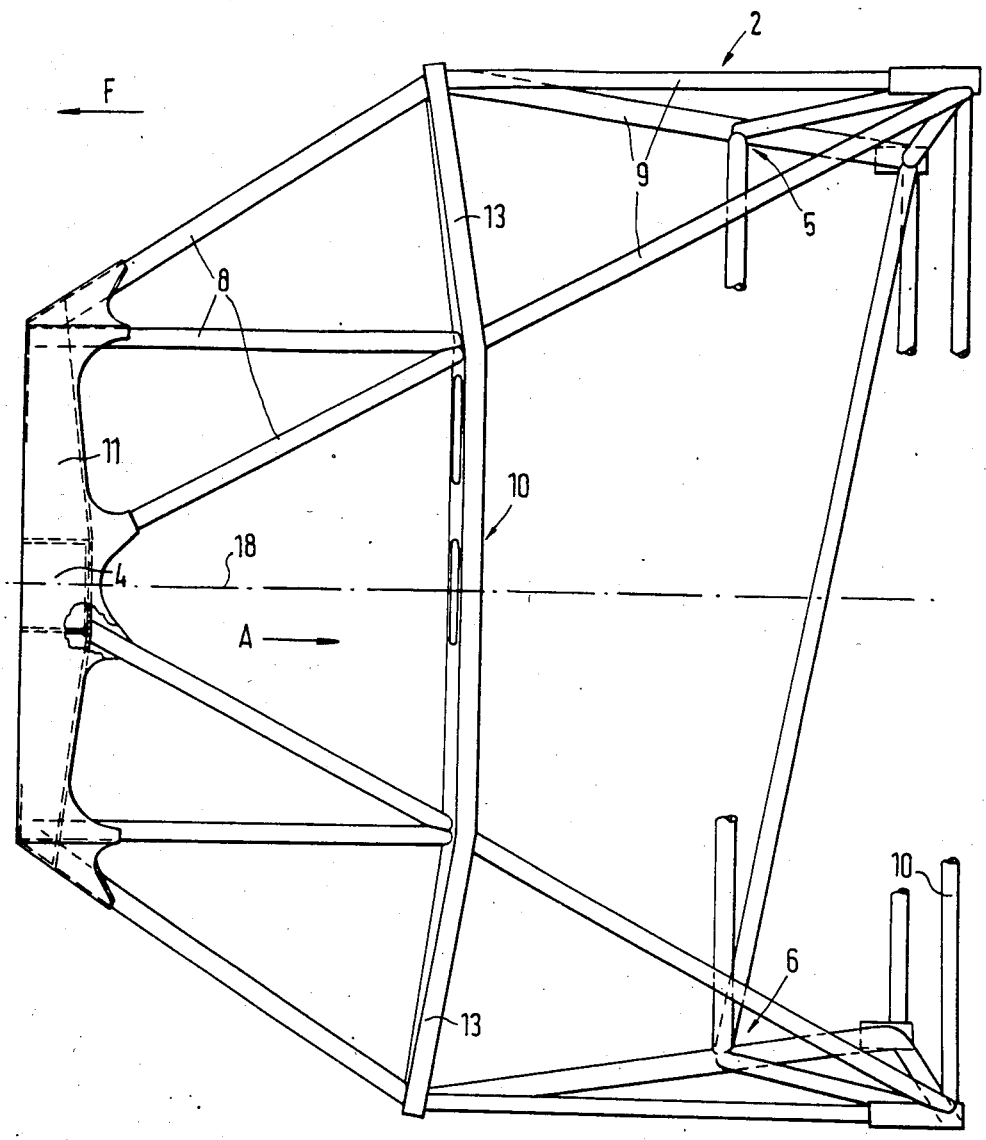
FIG. 5 is a plan view on the supporting framework according to FIG. 4.

The supporting frame 2 is constructed as support arm and extends over the propulsion unit 1 from above. It forms together with its struts 8, 9 and 10 a rigid strut-trussing framework which includes a cross-bearer constructed as bow-shaped member 10 and arranged approximately centrally of the propulsion unit, which connects tension and compression struts extending toward the rear, upwardly and transversely—as viewed in the flight direction F. The forwardly extending struts are all designated by reference numeral 8 for purposes of simplification; the rearwardly extending struts all by reference numeral 9 and the cross struts all by reference numeral 10. The struts 8 are secured in a forward cross-bearing 11 which carries the forward bearing 4 in a bracket 12a for fixing the propulsion unit 1. The further struts 9 form a triangular connection 2a (FIG. 4) on each side of the propulsion unit 1. The further struts 9 are connected with each other into a unit by way of cross struts 10. In each triangular connection 2a, a rear bearing 5 and 6 for the further fixing of the propulsion unit is provided in a bracket 12.

Figure 2:
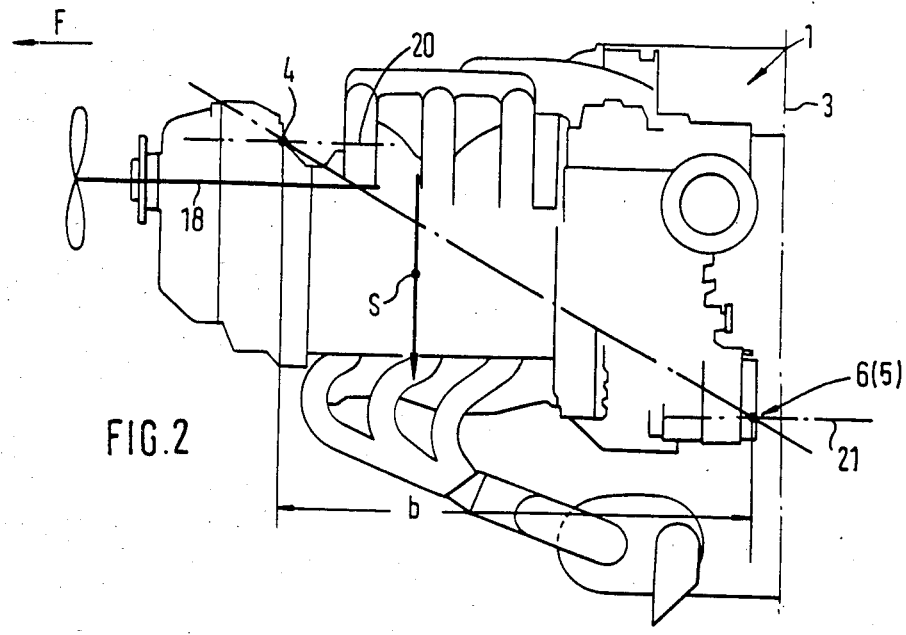
FIG. 2 is a side view of the propulsion unit according to this invention with indicated lines of actions and horizontal planes.

The bow-shaped member 10 of the supporting frame 2 which is arranged approximately centrally above the propulsion unit 1 has a trapezoidal shape as viewed from in front—direction of arrow A (FIG. 2). The bow-shaped member 10 is constructed bending-rigid in its cross plane to such an extent that a deflection of its two legs 13 toward the outside and therewith a tipping of the propulsion unit a great positive accelerations (g-loads) is precluded.

Figure 3:
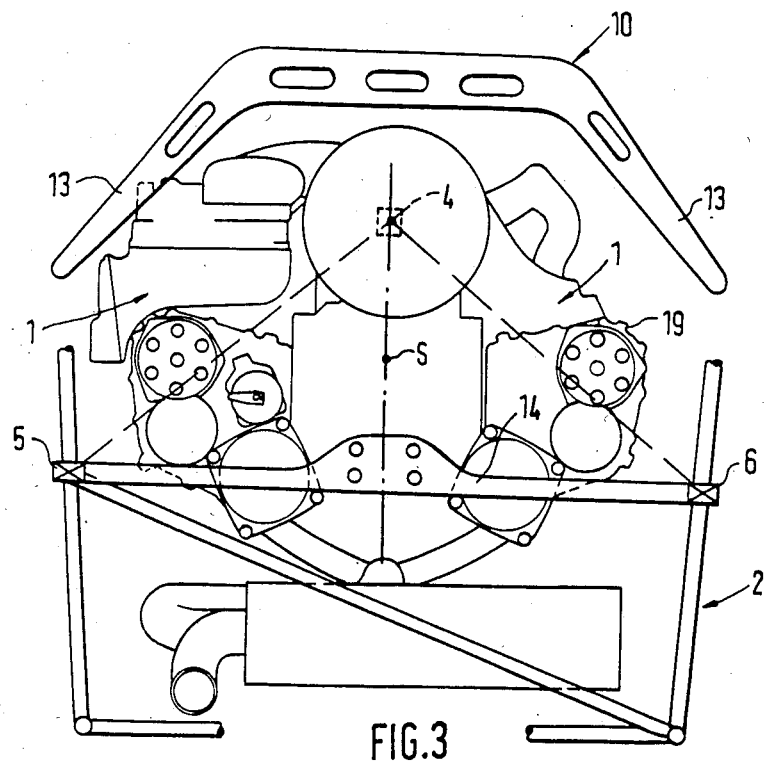
FIG. 3 is a rear view of the propulsion unit with a connecting member.

The propulsion unit 1 is connected with a transversely disposed connecting member 14 (FIG. 3) at its end facing the fire wall 3. The connecting member is fixedly attached to the propulsion unit and is thus, as an extension arm thereof, part of the propulsion unit which is attached to the support framework. Bearing shafts 15 are provided at the two free ends of the connecting member 14 (FIG. 6) which are retained supported in the rear bearing 5 and 6 under interposition of elastic elements 16.

Owing to the arrangement of the overhanging support frame 2, it becomes possible in a simple manner to mount the completed propulsion unit including exhaust gas installation and additional aggregates.

In FIG. 1 the arrangement of the bearings 4, 5 and 6 is shown schematically in relation to a line of action 17 which extends to the center of gravity S and in relation to a further line of action 18 of the propeller thrust P. A favorable vibration behavior of the propulsion unit 1 is achieved if these two lines of action 17 and 18 penetrate through an ideal surface 19 formed by the three bearings 4, 5 and 6. The respective penetration of the lines of action 17 and 18 through the ideal surface 19 is indicated as circle.

In the illustrated bearing arrangement a forward bearing 4—in relation to the flight direction F—is provided in a first upper horizontal plane 20 above the line of action 18 of the propeller thrust P. However, it is also possible to provide two closely adjacent forward bearings.

The further two rear bearings 5 and 6 are arranged in a second horizontal plane 21 offset downwardly underneath the line of action 18 of the propeller thrust P. In particular the forward bearing 4 is located within the area of the vertical longitudinal plane 22 which extends through the center of gravity S. The two rear bearings 5 and 6 are retained at approximately the same distance a on both sides of the vertical longitudinal plane 22.

According to a further embodiment which is not illustrated in detail, the forward bearing 4 can also be located in the lower horizontal plane 21 and the two rear bearings 5 and 6 in the upper horizontal plane 20. The conditions of the penetration of the ideal surface 19 formed by the bearings 4, 5 and 6 by the lines of actions 17 and 18 are also fulfilled in this embodiment.

According to a still further embodiment an optimal bearing support of the propulsion unit is fulfilled if it is achieved that the center of gravity S of the propulsion unit 1 with auxiliary aggregates coincides with the center of gravity of the ideal surface 19 and therebeyond the line of action 18 of the propeller thrust P extends through the ideal surface 19 in this point.

The geometry of the rubber bodies of the bearings 4, 5 and 6 permits it to match the stiffness of the bearings in the three directions disposed perpendicular to one another separately from one another within certain limits.

In the flight direction F the thrust acts as essentially static load. Additionally harmonic vibrations occur as a result of the rotation of the propeller.

For the good insulation the rubber elements should be soft in this direction but should carry the static load. By reason of the propeller axis which is located relatively high in proximity of the upper bearing 4, this force is divided in the instant embodiment at a ratio 5.4:1 (ratio of the lever arms). This means the upper bearing 4 must be 5.4 times stiffer in the flight direction F than the lower two bearings 5 and 6 together. Rubber is stiffer 6 to 7 times in case of load in compression than shear. The forward bearing 4 therefore forms a pessure pad in the flight direction F whereby the webs of the lower bearings 5 and 6 are loaded in thrust.

Large self-motivating levels in the cylinder direction exist transversely to the flight direction. Only small retaining forces are required so that the bearings 4, 5 and 6 can be constructed as soft as possible.

In the vertical direction the bearings 4, 5 and 6 are statically loaded by the engine weight and by the support of the driving torque. Dynamic exitations occur only to an insignificant amount.

The weight is distributed in the illustrated embodiment, for example at the ratio of 2.6:1. The forward bearing 4 would therefore have to be 2.6 times stiffer in the vertical direction than the two rear bearings 5 and 6.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A three point bearing unit suspension for vehicles, especially for propeller driven aircrafts, comprising: a propeller driven propulsion unit, a supporting frame means for absorbing propeller thrust as well as gravity forces of the propulsion unit and which supporting frame means is supported at a fire wall means, bearing means solely retaining the propulsion unit at said supporting frame means at only three points, the three points being arranged with respect to one another in two horizontal planes offset in height, a line of action of the gravity and a further line of action of the propeller thrust extending through an ideal plane delimited by the three points.

2. A suspension according to claim 1, wherein the three bearing points are oriented as follows: one forward bearing point as viewed in the flight direction is arranged in a first upper horizontal plane and two further rear bearing points are arranged in a second lower horizontal plane offset in height to the first horizontal plane.

3. A suspension according to claim 2, wherein the forward bearing point is arranged in the supporting frame means within the area of a vertical longitudinal plane through the line of action of the center of gravity of the propulsion unit as well as above the line of action of the propeller thrust.

4. A suspension according to claim 3, wherein the two rear bearing points are arranged in the supporting frame means at approximately the same distance on both sides of a central vertical longitudinal plane of the supporting frame means and below the line of action of the propeller thrust.

5. A suspension according to claim 2, wherein the two rear bearing points are arranged in the supporting frame means at approximately the same distance on both sides of a central vertical longitudinal plane of the supporting frame and below the line of action of the propeller thrust.

6. A suspension according to claim 1, with an arrangement of the bearing means in which the center of gravity of the propulsion unit substantially coincides with the center of gravity of the ideal plane formed by the three bearing points and additionally the line of action of the propeller thrust extends through the ideal plane substantially in this point.

7. A suspension according to claim 1, with the bearing means being elastic and in which significant self-motivating forms of rigid body vibrations of the propulsion unit are operable to be decoupled from one another in the elastic bearing means.

8. A suspension according to claim 1, wherein said bearing means includes individual bearings with the stiffnss of the individual bearing operable to be matched in three directions disposed perpendicular to one another.

9. A suspension according to claim 8, wherein the arrangement of the individual bearings as well as the stiffnesses thereof are so matched to one another that the loads occurring as a result of the propeller thrust effect a translation of the propulsion unit parallel to the line of action of the propeller thrust in that a different spring stiffness of the individual bearings is provided in the flight direction in dependence on the position of the propeller axis.

10. A suspension according to claim 8, wherein the individual bearings are constructed relatively soft in the transverse direction.

11. A suspension according to claim 8, wherein the individual bearings include one forward and two rearward bearings wherein the forward bearing is relatively soft in the vertical direction and the rear bearing are constructed relatively stiff in the vertical direction.

12. A suspension according to claim 1, wherein the supporting frame means is constructed as a rigid trussing framework which extends over the propulsion unit from above, said trussing framework including a transversely arranged bearer means constructed as bow-shaped member, and struts which lead to forward and rear bearings and which are connected with each other, said struts being retained at said bow-shaped member.

13. A suspension according to claim 12, wherein the bow-shaped member is constructed substantially trapezoidally shaped, as viewed in end view, and is connected by leg ends with struts, the struts extending to a forward cross-bearer means receiving a forward bearings of the said bearing means and further divergingly arranged struts extending to two rear bearings of the said bearing means for being fixed at the fire wall.

14. A suspension according to claim 12, wherein the bow-shaped member is constructed relatively bending-rigid in a vertical cross plane.

15. A suspension according to claim 13, wherein the two rear bearings of the propulsion unit are each arranged at ends of a transversely disposed connecting member which is a part of the propulsion unit.

16. A three bearing propulsion engine unit suspension for vehicles, particularly for propeller driven airplanes comprising a propeller unit and a propulsion unit and having a supporting frame means that is supported at a bulkhead partition, the propeller and propulsion units being held at said supporting frame means at only three points by three bearings, the bearings being arranged in two horizontal planes that are vertically offset with respect to one another, and wherein a line of action of gravity force of the propeller unit and propulsion unit as well as another line of action of propeller thrust of the propeller unit extends through an ideal plane delimited by the three bearings.

17. A three bearing propulsion engine unit suspension for vehicle, particularly for propeller-driven airplanes, comprising a propeller unit and a propulsion unit and having a supporting frame means that is supported at a bulkhead partition, the propulsion engine unit being held at said supporting frame means at only three points by three bearings, the bearings being arranged in two different horizontal planes, wherein the supporting frame means is developed as a trussing strut frame reaching over the propulsion engine unit from above and comprises three holding bearings for the propulsion engine unit that are elastically adapted to one another, and wherein a first of the three bearings is a front bearing being located in an upper horizontal plane in an area of a central longitudinal plane of the unit which extends vertically through a point of gravity of the propeller unit and propulsion engine unit, and wherein two remaining bearings are rear bearings being arranged in a lower horizontal plane than the front bearing and approximately symmetrically to both sides of the longitudinal plane, and said two rear bearings and the single front bearing defining an ideal plane penetrated by lines of action due to forces of gravity on the propeller unit and propulsion engine unit as well as forces due to propeller thrust of the propulsion unit.

18. A suspension according to claim 17, characterized by the point of gravity of the propeller unit and propulsion engine coinciding with a point of gravity of the ideal plane and formed by the three bearings and the line of action of the propeller thrust penetrating the ideal plane at this point.

* * * * *